(12) United States Patent
Sampath

(10) Patent No.: US 8,532,820 B1
(45) Date of Patent: Sep. 10, 2013

(54) CLOUD SERVICE TO MANAGE ROBOTIC DEVICES

(71) Applicant: Satish Kumar Sampath, London (GB)

(72) Inventor: Satish Kumar Sampath, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/622,456

(22) Filed: Sep. 19, 2012

(51) Int. Cl.
*G05B 19/00* (2006.01)

(52) U.S. Cl.
USPC ........... 700/248; 700/245; 700/247; 705/26.5

(58) Field of Classification Search
USPC ................. 700/245, 247, 248; 705/39, 26.1, 705/26.5, 26.41, 26.35, 26.81, 307
See application file for complete search history.

(56) References Cited

U.S. PATENT DOCUMENTS

2008/0309665 A1* 12/2008 Gregory et al. ............... 345/420

OTHER PUBLICATIONS

Jiang et al., "TeleRP—an Internet web-based solution for remote rapid prototyping service and maintenance", 2001, Int. J. Computer Integrated Manufacturing, vol. 14, No. 1, pp. 83-94.*
Huang et al., "A web-based custom service system for rapid prototyping", 2003, IEEE International Conference on Systems, Man and Cybernetics, vol. 5, pp. 4797-4802.*
Rajagopalan et al., "Integrated Design and Rapid Manufacturing over the Internet", 1998, ASME Design Engineering Technical Conference.*
Sokalski et al., "The Process", Accessed May 2001, Carnegie Mellon University's: Rapid Design through Virtual and Physical Prototyping, http://www.cs.cmu.edu/~rapidproto/students.99/mjp2/project2/Process.html.*
Luo et al., "E-Manufacturing: Web-Based Desktop Rapid Prototyping System", Jun. 2004, Proceedings of the 5th World Congress on Intelligent Control and Automation, pp. 2824-2829.*

* cited by examiner

*Primary Examiner* — Khoi Tran
*Assistant Examiner* — Spencer Patton
(74) *Attorney, Agent, or Firm* — McDonnell Boehnen Hulbert & Berghoff LLP

(57) ABSTRACT

Methods and systems enabling a cloud service to manage robotic devices are provided. An example method includes receiving a task order including information that identifies configuration requirements for a robotic device to perform a task, program instructions executable by the robotic device to perform the task, and payment information for the task. The method may also include selecting one or more robotic devices to perform the task from among a pool of robotic devices. For instance, the selected one or more robotic devices may be leased for a period of time to perform the task. The method may further include providing the configuration requirements and the program instructions to the selected one or more robotic devices, and receiving confirmation that the task has been performed. According to the method, payment may be provided to one or more accounts registered with the selected one or more robotic devices.

18 Claims, 8 Drawing Sheets

CLOUD SERVICE TO MANAGE ROBOTIC DEVICES

FIELD

This disclosure relates to cloud computing, and in examples, to a cloud computing service for managing and/or controlling robotic devices.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or use productivity applications on a remote server rather than physically carrying around a storage medium, such as a DVD or thumb drive.

In some examples, a robotic device may communicate with a server in a cloud to perform a variety of tasks. For instance, a robotic device may include sensors such as a gyroscope, optical sensor, biosensor, etc., as well as actuators, such as motors, wheels, and moveable arms. The robotic device may receive instructions from the cloud for operating the sensors and/or actuators in order to recognize and grip an object, navigate through an environment, or perform other types of tasks.

SUMMARY

In one example aspect, a method is provided that includes receiving a task order including information that identifies configuration requirements for a robotic device to perform a task, program instructions executable by the robotic device to perform the task, and payment information for the task. The method may also include a computing device having a processor and a memory selecting one or more robotic devices to perform the task from among a pool of robotic devices. Given robotic devices of the pool may be configured to operate at given remote locations. Additionally, the selected one or more robotic devices may be leased for a period of time to perform the task. The method may further include providing the configuration requirements and the program instructions to the selected one or more robotic devices, and receiving confirmation that the task has been performed. According to the method, payment may be provided to one or more accounts registered with the selected one or more robotic devices.

In another example aspect, a computer-readable medium is provided having stored therein instructions that, when executed by a computing device, cause the computing device to perform functions. The functions may include receiving a task order including information that identifies configuration requirements for a robotic device to perform a task, program instructions executable by the robotic device to perform the task, and payment information for the task. The functions may also include selecting one or more robotic devices to perform the task from among a pool of robotic devices. Given robotic devices of the pool may be configured to operate at given remote locations. Additionally, the selected one or more robotic devices may be leased for a period of time to perform the task. The functions may further include providing the configuration requirements and the program instructions to the selected one or more robotic devices, and receiving confirmation that the task has been performed. According to the functions, payment may be provided to one or more accounts registered with the selected one or more robotic devices.

In still another example aspect, a system is provided that includes at least one processor and a memory. The memory may include stored instructions that are executable by the at least one processor to cause the processor to perform functions. The functions may include receiving a task order including information that identifies configuration requirements for a robotic device to perform a task, program instructions executable by the robotic device to perform the task, and payment information for the task. The functions may also include selecting one or more robotic devices to perform the task from among a pool of robotic devices. Given robotic devices of the pool may be configured to operate at given remote locations. Additionally, the selected one or more robotic devices may be leased for a period of time to perform the task. The functions may further include providing the configuration requirements and the program instructions to the selected one or more robotic devices, and receiving confirmation that the task has been performed. According to the functions, payment may be provided to one or more accounts registered with the selected one or more robotic devices.

In yet another example aspect, a method is provided that includes receiving a request to register an account for a robotic device with a cloud service. The cloud service may be configured to receive a task to be performed by robotic devices that are selected from among a pool of robotic devices and leased for a period of time to perform the task. Also, the robotic device may be among the pool of robotic devices. The method may also include receiving configuration requirements for the robotic device to perform the task and program instructions executable by the robotic device to perform the task. Additionally, the method may further include providing the program instructions to the robotic device for execution by the robotic device to perform the task based on the configuration requirements, and receiving a result of performance of the task at the cloud service. According to the method, payment for the task may be provided via the account.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
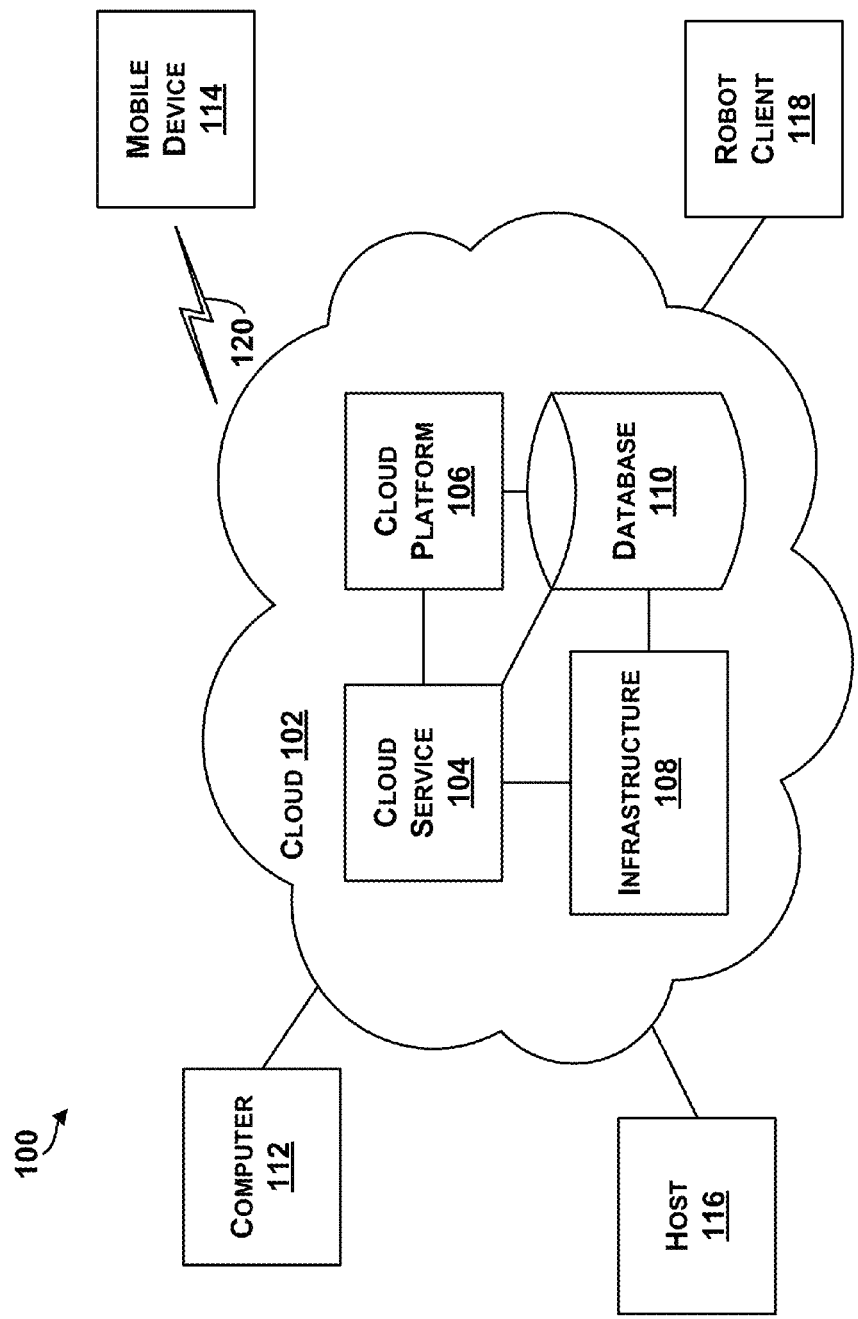
FIG. 1 is an example system for cloud-based computing.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems enabling a cloud service to manage/control robotic devices. The methods and systems described herein may allow a user, for example a small business owner, to rent one or more robotic devices from a pool of robotic devices to perform a task. In one case, the user may provide program instructions that are executable by the one or more robotic devices to perform the task. For instance, the program instructions may be provided to a cloud service which selects robotic devices and provide the program instructions to the robotic devices. In some instances, the user may also provide information associated with input materials required for performing the task, and the cloud service may arrange for the input materials to be provided to the robotic devices.

The tasks performed by the robotic devices may include manual and/or skilled labor tasks such as assembling toys or electronics from component parts, sorting clothing or other types of products, detecting defects for quality assurance or other purposes, polishing/painting objects, or performing experiments. Other examples of tasks are also possible. The pool of robotic devices may include one or any combination of general purpose robotic devices and specialized robotic devices that may be leased for a period of time to perform a task. For instance, the general purpose robotic devices may be configurable to perform a wide variety of tasks. Optionally, based on the configuration requirements for a given task, the general purpose robotic devices may employ the use of add-ons such as attachable lasers, fingers with different tips for varying grips, or other types of add-ons.

In some examples, users may purchase one or more robotic devices that are maintained by the user and connect the robotic devices to the cloud service. If the robotic devices are selected by the cloud service to perform a task, the user may be compensated for the task by another user that requested the task to be performed. Thus, the user may receive a revenue stream as their robotic devices periodically perform various tasks. Alternative and additional examples and embodiments of the methods and systems are further described below.

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more or fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the cloud infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, tablet computer, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms. For example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured to use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

Figure 2A:
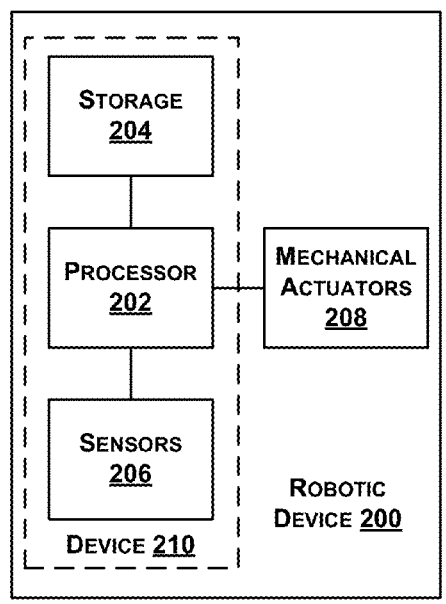
FIGS. 2A-2C are example illustrations of robotic devices.
Figure 2B:
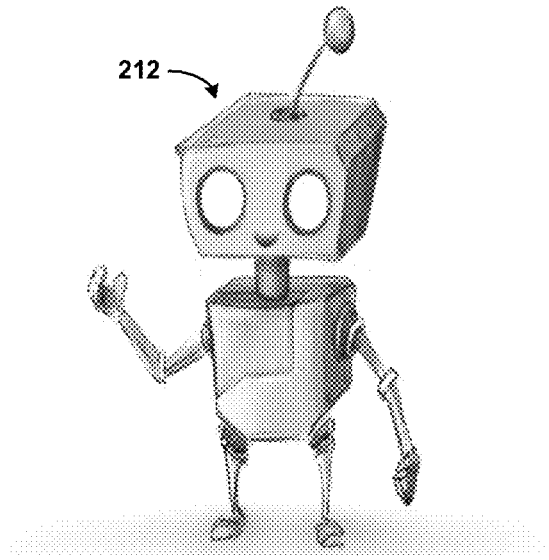
Figure 2C:
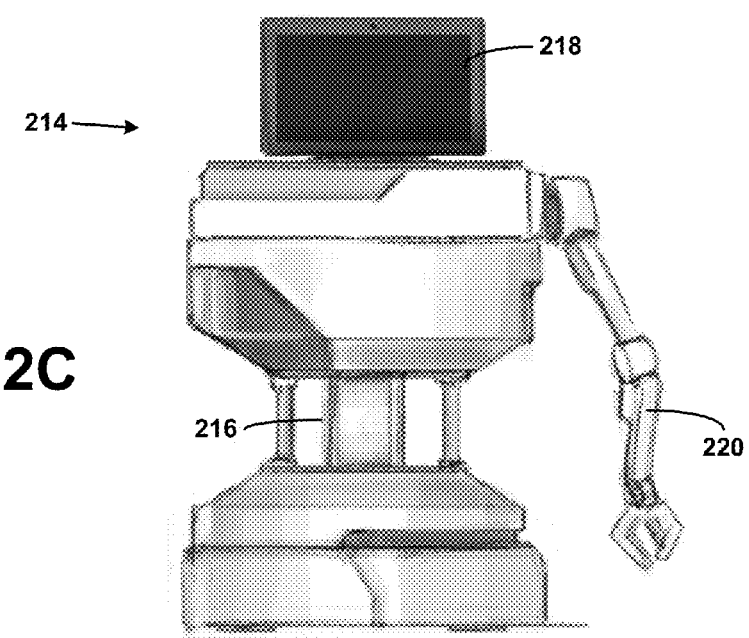

FIGS. 2A-2C are example illustrations of robotic devices. Any of the robots illustrated in FIGS. 2A-2C may be configured to operate according to example methods described herein, or according to instructions received from devices that may be configured to operate according to example methods described herein.

An example illustration of a robotic device 200 is shown in FIG. 2A. In one example, the robotic device 200 is configured as a robot. In some examples, a robot may contain computer hardware, such as a processor 202, memory or data storage 204, and one or more sensors 206. For example, a robot controller (e.g., processor 202, computing system, and sensors 206) may all be custom designed for a specific robot. The robot may have a link to access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robotic device 200 and storing program instructions. The processor 202 may be coupled to the storage 204 and may be configured to control the robotic device 200 based on the program instructions. The processor 202 may also be able to interpret data from the various sensors 206 on the robot. Example sensors may include cameras, smoke sensors, light sensors, radio sensors, infrared sensors, microphones, speakers, gyroscopes, accelerometers, distance sensors, radars, capacitive sensors, and touch sensors, etc. Example distance sensors include infrared ranging sensors, photoelectric distance sensors, proximity sensors, ultrasonic sensors, radars, or other types of sensors that may provide outputs used to determine a distance of the robotic device 200 to an object.

The robotic device 200 may also have components or devices that allow the robotic device 200 to interact with an environment of the robotic device 200. For example, the robotic device 200 may have a camera to provide images of a field of view of the environment as well as mechanical actuators 208, such as motors, wheels, movable arms, etc., that enable the robotic device 200 to move or interact with the environment.

In some examples, various sensors and devices on the robotic device 200 may be modules. Different modules may be added or removed from the robotic device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the robotic device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the robotic device 200 may include mechanical robot features, and may be configured to receive the device 210 (e.g., a mobile phone), which can provide additional peripheral components to the robotic device 200, such as any of an accelerometer, gyroscope, compass, GPS, camera, WiFi connection, a touch screen, etc., that are included within the device 210.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The sensors 218 may be included within a tablet device, which may also function as the computing device 216. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

Figure 3:
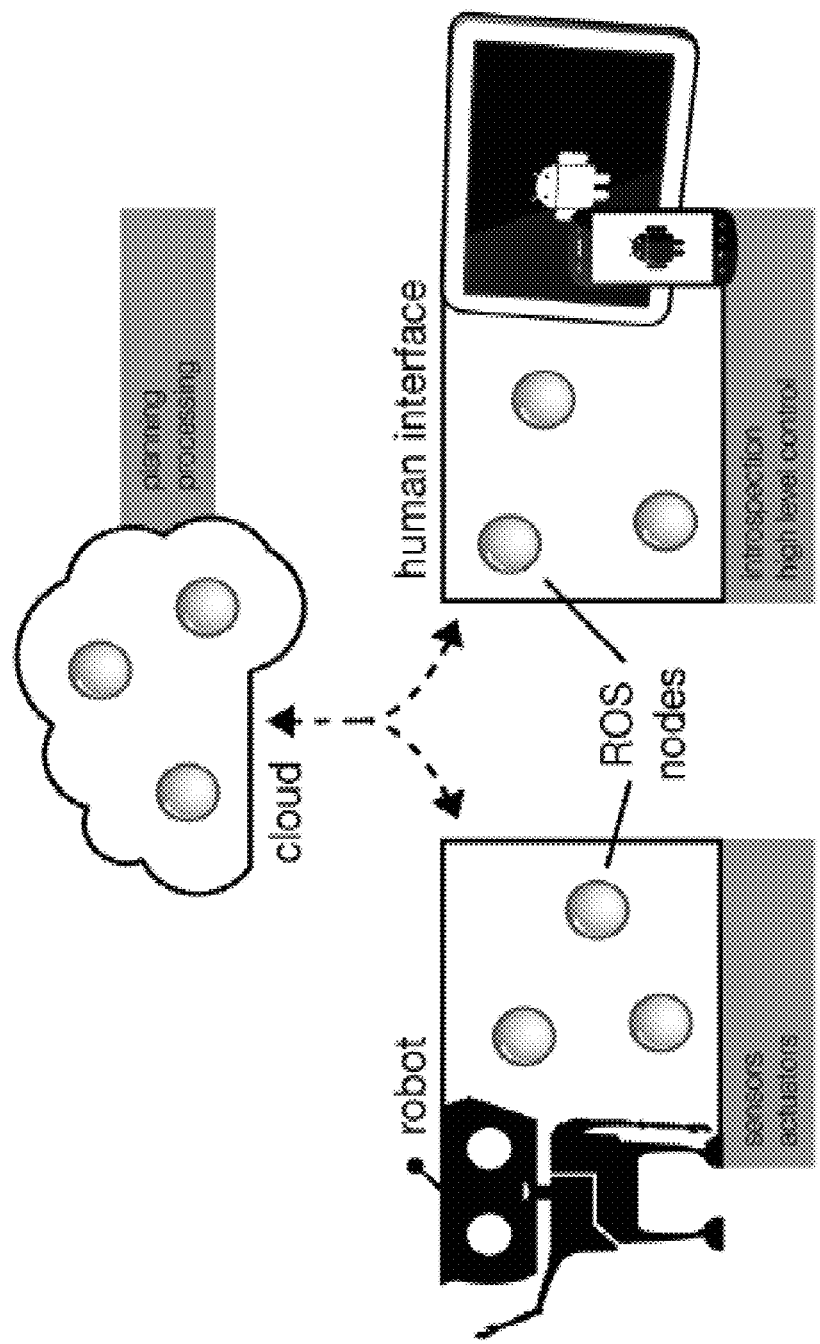
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example, the robot may receive data from the cloud. The data received from the cloud may be in many different forms. The received data may be a processed form of data the robot sent to the cloud. The received data may also come from sources other than the robot. For example, the cloud may have access to other sensors, other robots, and the internet. Although FIG. 3 presents an example of a conceptual robot-cloud interaction, other robotic devices may perform planning and/or processing locally.

Figure 4:
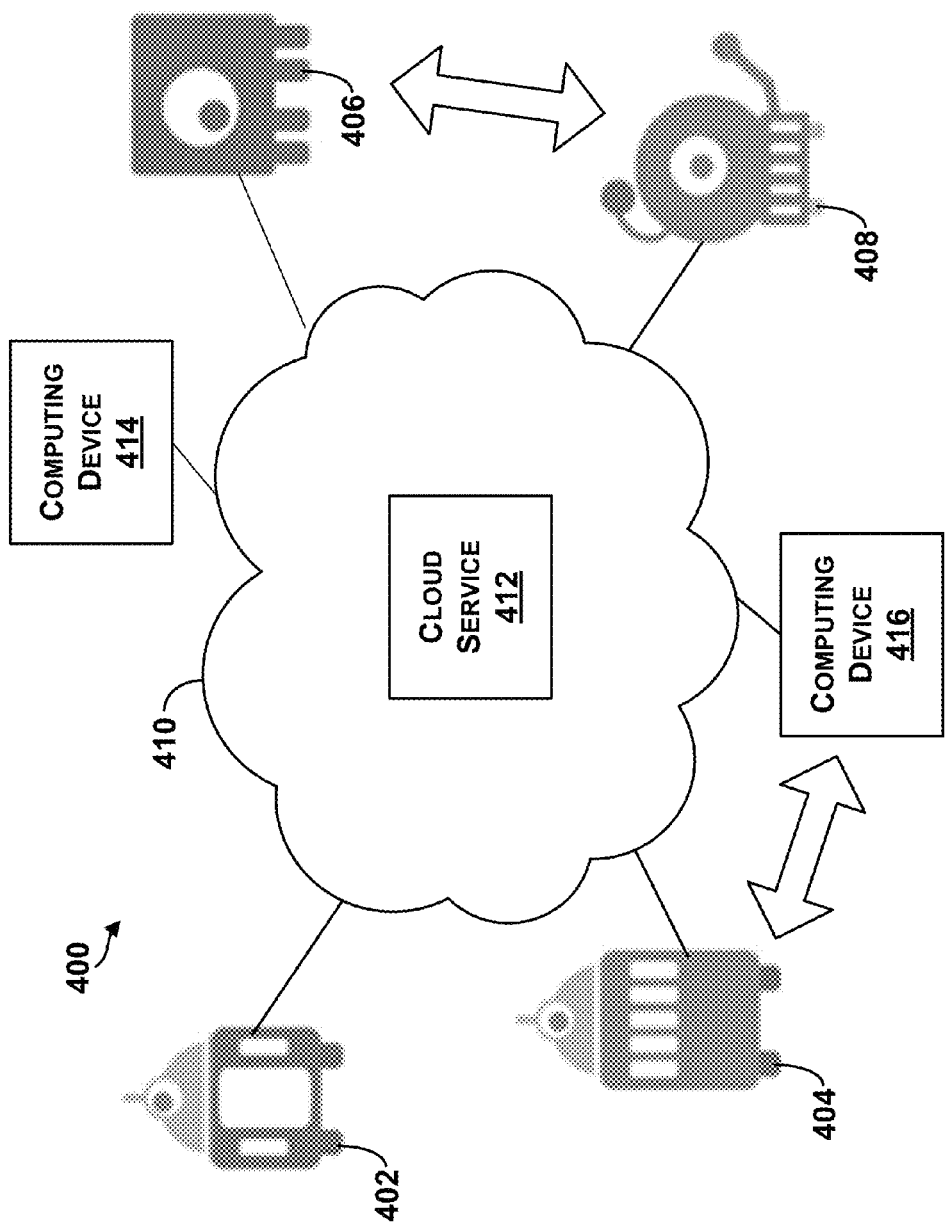
FIG. 4 is an example system in which robotic devices may interact with a cloud service.

FIG. 4 is an example system 400 in which robots may interact with a cloud service. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408). Each robot 402, 404, 406, 408 may be located in the same or in different locations. For example, robots 406 and 408 may be located in a first warehouse while robots 402 and 404 are located in a separate warehouse at a separate location.

In one example, a cloud service 412 may select one or more of robots 402, 404, 406, and 408 to perform a task. For example, the cloud service may include a processor and a memory and may be configured to receive a task order from one of computing devices 414 and 416. The task order may include information that identifies configuration requirements for a robot to perform a task as well as program instructions for the robot to perform the task. Additionally, the task order may include payment information associated with the task.

As shown in FIG. 4, one or more of robots 402, 404, 406, and 408 may be configured to communicate with computing devices 414 and 416 directly or through the cloud 410. For instance, robot 404 may be selected by the cloud service to perform a task requested by computing device 416. Subsequently robot 404 may provide feedback to computing device 416 about the task. In one example, the feedback may include a real-time camera feed as the robot 404 performs the task. In other examples, the feedback may include data determined by one or more sensors of the robot 404 during or after performing a task.

Further example interaction between the robots 402, 404, 406, and 408, the cloud service 412, and the computing devices 414 and 416 of system 400 is described below. For example, the cloud service 412 may be configured to perform the method 500 described with respect to FIG. 5.

Figure 5:
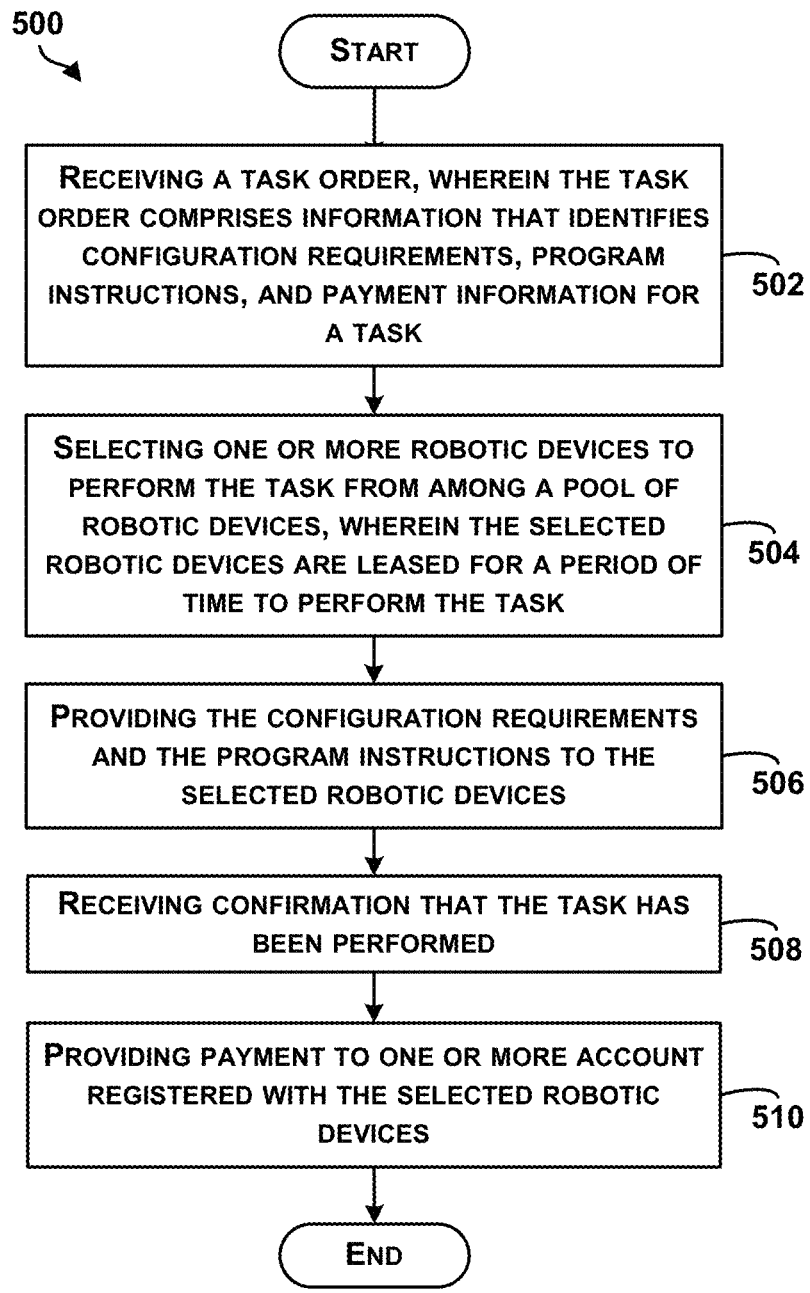
FIG. 5 is a block diagram of an example method of managing robotic devices, in accordance with at least some embodiments described herein.

FIG. 5 is a block diagram of an example method 500 of managing robotic devices. Method 500 shown in FIG. 5 presents an embodiment of a method that could be used with the system 100 of FIG. 1 or system 400 of FIG. 4, for example. Method 500 may include one or more operations, functions, or actions as illustrated by one or more of blocks 502-510. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

At block 502, the method the method 500 includes receiving a task order. The task order may include information that identifies configuration requirements for a robotic device to perform a task, program instructions executable by the robotic device to perform the task, and payment information for the task.

In one example, the task order may be received via a web service that is hosted as part of a cloud service. For example, the web service may be similar to the cloud platform 106 of FIG. 1, and may be accessible by developers/task requestors who can book one or more robots for a specified period of time. In some cases, the web service may list robotic devices of a pool of robotic devices that are available to perform a task. The robotic devices may be categorized by configuration or functionality. For instance, the web service may describe general purpose robotic devices that can be configured to include lasers or cameras or specialized robotic devices that are configured to perform a specific task or type of task. A developer may indicate, within the task order, configuration requirements, such as required add-ons or functionalities necessary to perform a task. The developer may also upload a program for a robotic device to follow to perform a task. In one example, the program may include program instructions, such as instructions that are compatible with a robot operation system, that are executable by the robotic device to perform the task. In other examples, the program may be interpreted by an owner of the robotic device who may program the robotic device to perform the task based on the program. Additionally, the task order may indicate an amount of money that the developer expects to pay for the task to be performed.

At block 504, the method 500 includes selecting (or determining) one or more robotic devices to perform the task from among a pool of robotic devices. For instance, a computing device connected to the web service in a cloud may assign the task to one or more robotic devices. In some instances, owners of the robotic devices may submit bids or quotes offering to perform the task by the robotic devices for an amount of money. The computing device may select robotic devices based on the quotes, selecting a cheapest quote, for example. In other examples, the computing device may select the robotic devices based on those robotic devices of the pool which are configurable to meet the configurations requirements of the task order. In still other examples, the computing device may select the robotic device based on proximity of the robotic device to a location of the task requestor. Additionally, the computing device may select the one or more robotic devices based on user rating. For instance, task requestors may rate robotic devices based on past performance.

At block 506, the method 500 includes providing the configuration requirements and the program instructions to the selected robotic devices. In one example, a cloud service may provide the configuration requirements and the program instructions to the selected robotic devices. In another example, the cloud service may provide a network address or other contact information to the developer or task requestor that provided the task order, and the developer or task requestor may send the configuration requirements and program instructions to the selected robotic devices. It is contemplated that the selected robotic devices may be in same or different locations.

In some instances, the task order may also include information that identifies input materials for performing the task, and the information about the input materials may be provided to the selected robotic devices such that the selected robotic devices can perform the task. For instance, the input materials may be actuators or sensors utilized by the selected robotic devices to perform the task. In another case, the input materials may be supply parts or other forms of input required to perform the task. As an example, the task may involve performing an experiment under varying circumstances. For instance, thousands of combinations of ingredient percentage, type/time of mixing, temperature, etc. may be tested by the selected robotic devices. The ingredients and any supplies for performing the experiment may be provided to the selected robotic devices. For example, the cloud service may order the ingredients and supply parts for delivery at the location(s) of the robotic devices or the task requestor may send the ingredients and supply parts to the location(s) of the robotic devices.

At block 508, the method 500 includes receiving confirmation that the task has been performed. In one example, the confirmation may be provided by the task requestor to the cloud service. For example, the task requestor may receive results or an output of the task, and indicate to the cloud service that the task has been performed. In one case, the task order may include a delivery address for an output of the task. The robotic device or an owner of the robotic device may provide the output of the task to the delivery address, and the task requestor may notify the cloud service that the task has been performed upon receipt of the output of the task at the delivery address. In an example in which the task includes assembling parts of a product, the assembled product may be provided to the delivery address. In an example in which the task includes inspecting a product, the delivery address may be an email or web address, and the inspection data as determined by performing the task may be uploaded or sent to the delivery address.

In some instances, the method 500 may also provide for feedback being provided to the task order while or after a task is performed. For instance, a real-time camera feed or other form of output from the robotic device may be provided to the task requestor, either directly or via the cloud service, for example, while the task is being performed. Thus, the task requestor may track the task as it is being performed.

At block 510, the method 500 includes providing payment to one or more accounts registered with the selected robotic devices. In some instances, the payment may be sent to an account(s) registered with the selected robotic devices in response to receiving the confirmation that the task has been performed. In other examples, payment may be sent or received prior to completion of the task performed, or with or in response to receipt of the task order at block 502.

Multiple payment and business models are contemplated for the described methods and systems. For instance, a company that hosts the cloud service may receive a portion of the payment provided to the account(s) (e.g., a flat fee per task order, or a percentage of the payment). In another example, the company may charge a fee for allowing task requestors or developers to access the cloud service. In other instances, the company may charge a fee for owners of robotic devices registering their robotic devices with the cloud service. Still other examples are also possible.

Figure 6A:
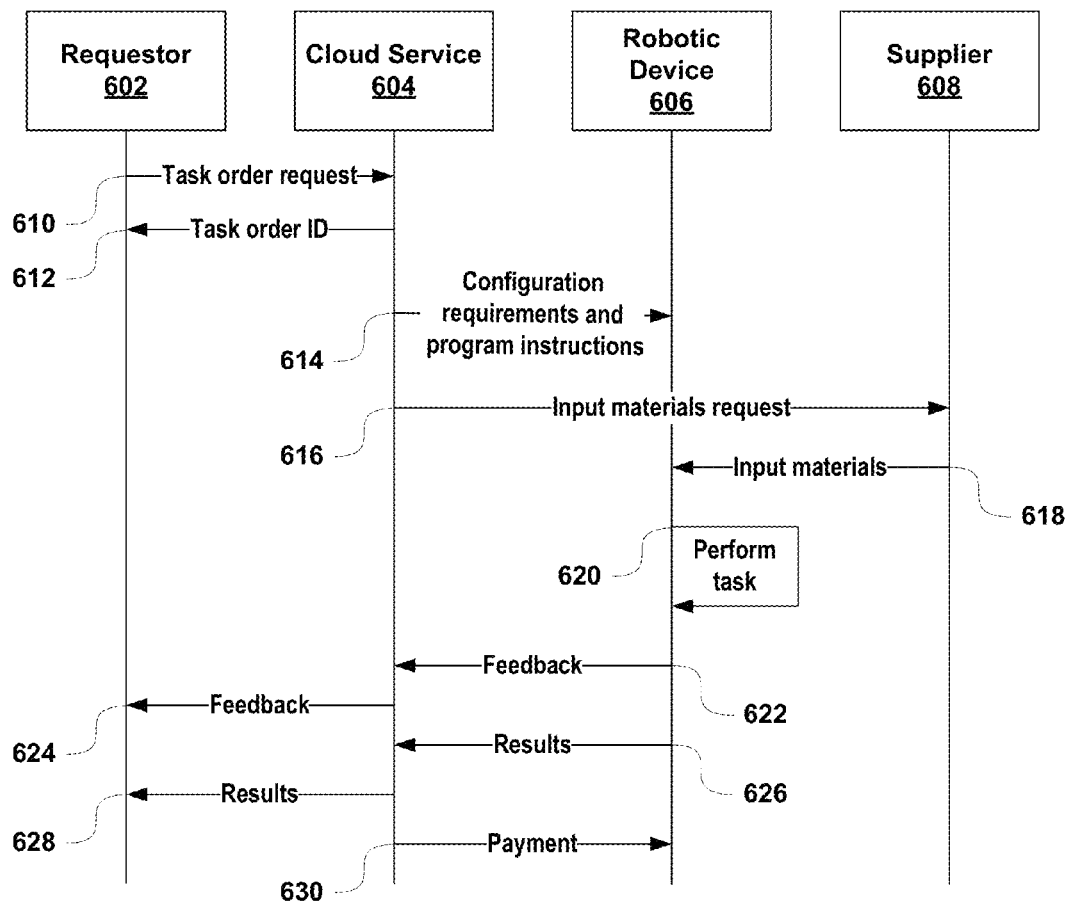
FIGS. 6A and 6B are example flow diagrams for managing robotic devices to perform a task.
Figure 6B:
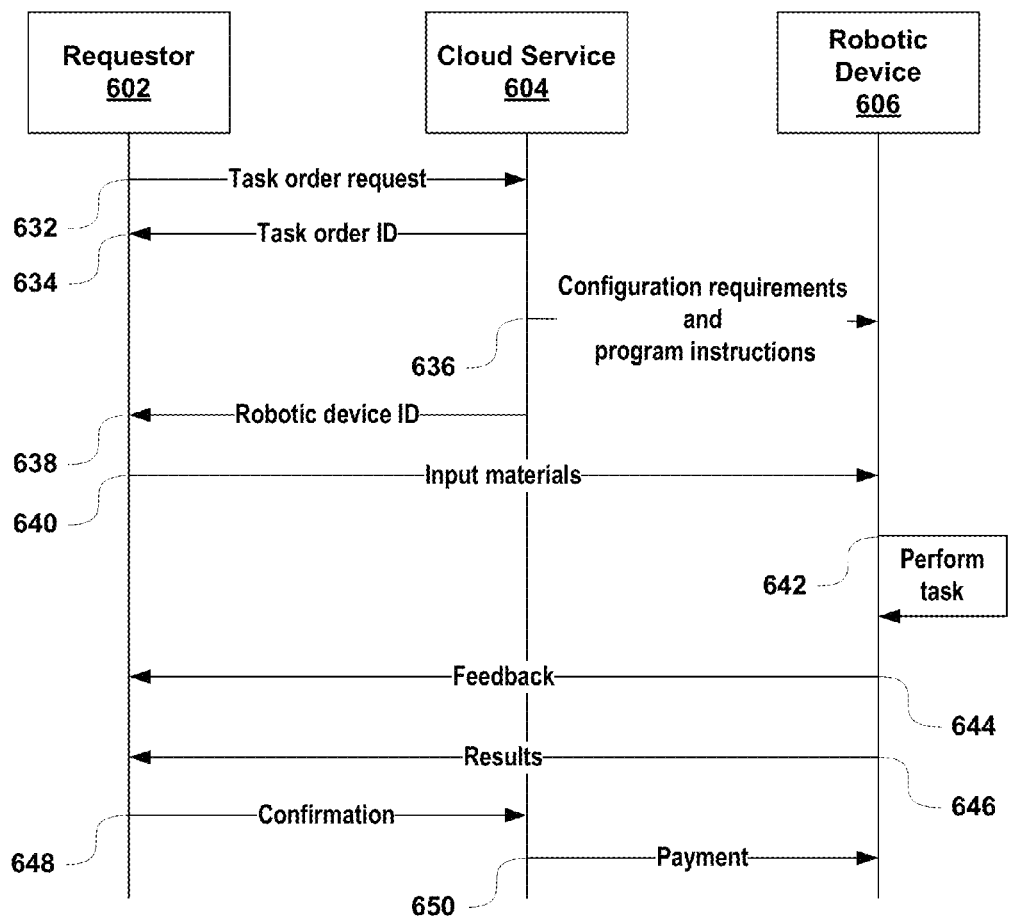

FIGS. 6A and 6B are example flow diagrams for managing robotic devices to perform a task. Although the flow diagrams depict sequential steps, the steps may be arranged in any order. Additionally, one or more steps may be added or removed. The example flow diagrams may describe example interaction between a requestor 602, cloud service 604, and robotic device 606. Additionally, FIG. 6A includes a supplier 608. The requestor 602 may be a task requestor or developer who submits a task order including a task to be performed by a robotic device. The robotic device 606 may be a robotic device that is selected by the cloud service 604 to perform the task. Although FIGS. 6A and 6B depict one robotic device, the example is not meant to be limiting.

Initially, as shown in FIG. 6A, at step 610 the requestor 606 provides a task order to the cloud service 604. The task order may include one or more of configuration requirements for a robotic device to perform a task, program instructions that are executable by a robotic device to perform the task, and payment information for the task. In response to receiving the task order, the cloud service 604 may provide the requestor 602 with a task order ID that identifies the task order. The task order ID may be provided within subsequent communications between the cloud service 604, requestor 602, robotic device 606, and supplier 608.

After the cloud service selects a robotic device to perform the task, the cloud service 604 may send configuration requirements and program instructions to the robotic device 606 at step 614. Additionally, at step 616, the cloud service 604 may send a request to a supplier 608 for input materials to perform the task. In response to receiving the input materials request, the supplier 608 may deliver the input materials to the robotic device 606 at step 618. As described previously, the input materials may include actuators or sensors for performing the task and/or supply parts for performing the task.

At step 620, the robotic device 606 may configure itself to perform the task based on the configuration requirements, and execute the program instructions to perform the task using the input materials. At step 622, the robotic device 606 may provide feedback to the cloud service 604 about the task. Although step 622 is shown as occurring after step 620, step 622 may be performed while the robotic device 606 is performing the task. Additionally, the cloud service 604 may relay the feedback to the requestor 602 at block 624.

After performing the task, at step 626, the robotic device 606 may provide the results of the task to the cloud service 604. Again, the cloud service 604 may relay the results to the requestor 602 at step 628. After sending the results to the requestor, the cloud service 604 may send payment to the robotic device 606 at step 630. For instance, payment that was received as part of the task order provided by the requestor 602 at step 610 may be provided to an account registered with the robotic device 606.

The flow diagram shown in FIG. 6B provides another example for a cloud service managing a task to be performed by a robotic device. Initially, similar to FIG. 6A, a task order request may be provided to the cloud service at step 632, and the cloud service 604 may provide a task order ID to the requestor 602 at step 634. The cloud service 604 may select a robotic device to perform the task, and configuration requirements as well as program instructions may be provided to the robotic device 606 at step 636. Additionally, the cloud service 604 may provide a robotic device ID to the requestor 602 at step 638. The robotic device ID may include information for communicating with the robotic device 606, such as an IP address or other form of contact information as well as location information, such as an average of the robotic device 606.

At step 640, the requestor 602 may provide input materials to the robotic device 606. As an example, the requestor 602 may ship one or more materials or add-ons to the robotic device 606. At block 642, the robotic device 606 may perform the task based on the configuration requirements and program instructions and using the input materials. Additionally, at step 644 the robotic device 606 may provide feedback to the requestor 602. At step 646, the robotic device 606 may also send results of performing the task, such as data or a tangible product, to the requestor 602.

In one example, in response to receiving the results of performing the task, the requestor may, at step 648, provide confirmation to the cloud service 604 that the task has been performed. In response to receiving the confirmation, at step 650, the cloud service may provide payment to an account registered with the robotic device 606.

Figure 7:
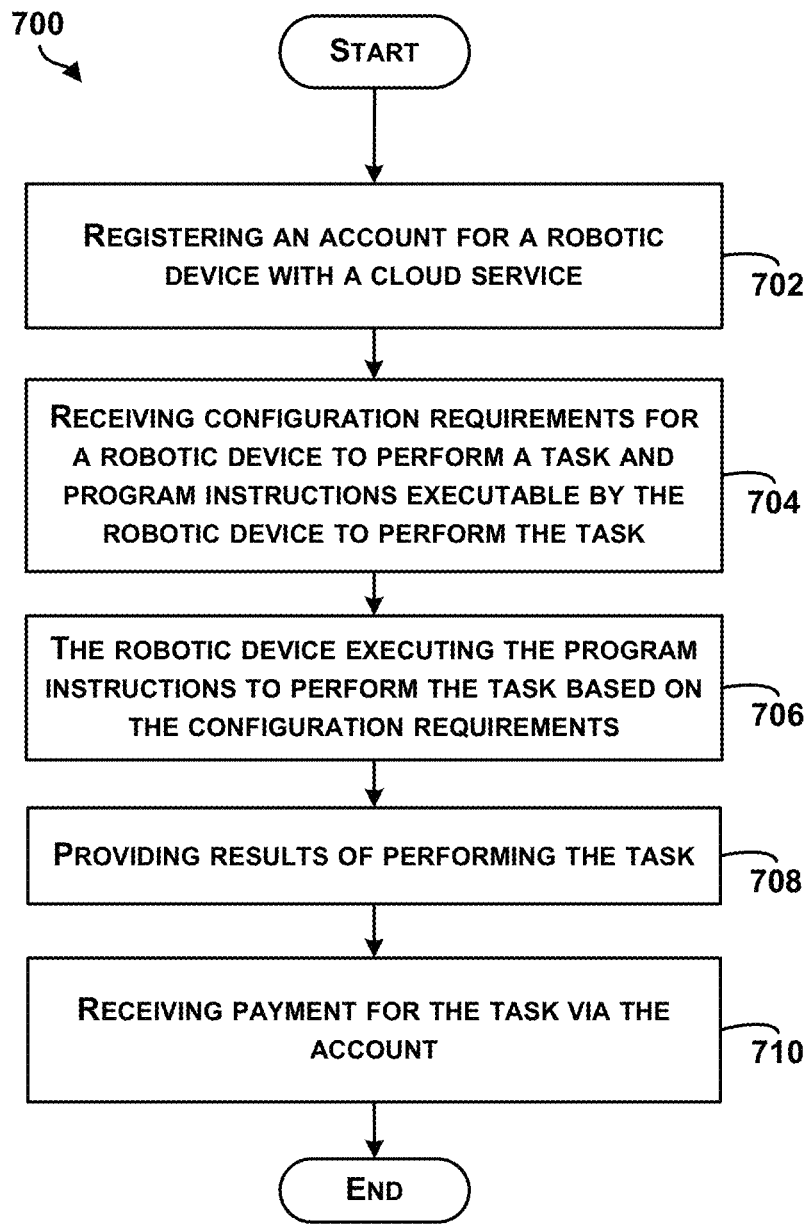
FIG. 7 is a block diagram of another example method.

In some examples, the cloud service may enable a task requestor to crowdsource a task that does not require all of the robotic devices that perform the task to be co-located. In lieu of the task requestor buying and maintain a pool of robotic devices, the task requestor may lease one or more robotic devices of a pool of robotic devices for a period of time. The robotic devices of the pool may be supplied by individuals or businesses, and managed by the cloud service. In response to being selected to perform a task, robotic devices, which may be thought of as a crowd in the well-known crowdsourcing distributed problem-solving and production model, perform the task and submit results. FIG. 7 below provides an example of the role of a robotic device in the crowdsourcing model.

FIG. 7 is a block diagram of another example method 700. The method 700 shown in FIG. 7 presents an embodiment of a method that may, for example, be used by a robotic device or a computing device connected to a robotic device. Method 700 may include one or more operations, functions, or actions as illustrated by one or more of blocks 702-710. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method. Each block may represent a module, a segment, or a portion of program code, which includes one or more instructions executable by a processor for implementing specific logical functions or steps in the process. In addition, each block in FIG. 7 may represent circuitry that is wired to perform the specific logical functions in the process.

At block 702, the method 700 includes registering an account for a robotic device with a cloud service. For example, an owner of a robotic device or multiple robotic devices may register the robotic devices with a web service that is connected to the cloud service. In one case, the owner may indicate the configuration abilities and functionalities of the robotic device. The cloud service may be configured to receive a task to be performed by one or more robotic devices that are selected from among a pool of robotic devices. A selected robotic device may be leased for a period of time to perform the task.

At block 704, the method 700 includes receiving configuration requirements for a robotic device to perform a task and program instructions executable by the robotic device to perform the task. In one example, the configuration requirements may be required add-ons or functionalities necessary to perform a task. The program instructions may include a program for the robotic device to follow to perform the task. In one example, the program may include program instructions, such as instructions that are compatible with a robot operation system, that are executable by the robotic device to perform the task. In other examples, the program may be interpreted by an owner of the robotic device who may program the robotic device to perform the task based on the program. In some examples, the robotic device may receive information about the task, and access a server to receive the program instructions executable by the robotic device to perform the task.

At block 706, the method 700 includes the robotic device executing the program instructions to perform the task based on the configuration requirements. As an example, the robotic device may configure itself to perform the task based on the configuration requirements. For instance, the robotic device may be a general purpose robotic device that is capable of attaching any add-ons necessary to perform the task. In some instances, the robotic device may also receive information about input materials for performing the task, and the robotic device may utilize the input materials when executing the program instructions. For example, supply parts may be shipped to the robotic device, and the robotic device may identify and assemble the supply parts as part of the execution of the program instructions.

At block 708, the method 700 includes providing results of performing the task to the cloud service. In one example, the program instructions may include an address for uploading results of performing the task, and the robotic device may send the results of the task to the address. For instance, the address may be an address of a database associated with the cloud service. In another example, a delivery address that is a location associated with a requestor of the task may be sent to the robotic device, and the robotic device or an owner of the robotic device may send an output of the task (e.g., an assembled product or data gathered by performing the task) to the delivery address.

At block 710, the method 700 includes receiving payment for the task via the account. For example, the cloud service may provide payment to the account registered with the robotic device. Thus, in some instances, owners of robotic devices may be motivated to contribute to crowdsourced tasks by the potential for financial gain.

In one example, the method 700 may enable anyone in the world to purchase one or more robotic devices and operate a small business. For instance, an owner may purchase multiple robotic devices to be operated at an owner's facility and lease them to the cloud service. After registering the robotic devices with the cloud service, the cloud service may provide information associated with tasks to be performed by the robotic devices at the facility. For example, the cloud service may provide supply parts or attachments necessary for the robotic device to perform the task as well as instructions for performing the task. After completing the task, the robotic devices or an owner of the robotic devices may provide the results to the cloud service or a requestor of the task. Examples of tasks that may be performed at the owner's facility include gene sequencing, medical image processing, or text recognition from scanned documents, among many other possibilities.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
  receiving a task order, wherein the task order comprises:
    information that identifies configuration requirements for a task to be performed by a robotic device that is selected from among a pool of robotic devices,
    program instructions executable by the robotic device to perform the task,
    information that identifies one or more actuators or sensors to be attached to the robotic device for performing the task, and
    payment information for the task;
  selecting, by a computing device having a processor and a memory, one or more robotic devices that are configurable to perform the task from among the pool of robotic devices, wherein given robotic devices of the pool are configured to operate at given remote locations and the selected one or more robotic devices are leased for a period of time to perform the task by attaching the one or more actuators or sensors;
  providing the configuration requirements, the information that identifies the one or more actuators or sensors, and the program instructions to the selected one or more robotic devices;

receiving confirmation that the task has been performed; and providing payment to one or more accounts registered with the selected one or more robotic devices.

2. The method of claim 1, wherein the task order further comprises information that identifies one or more supply parts for performing the task, and the method further comprises providing the information that identifies the one or more supply parts to the selected one or more robotic devices.

3. The method of claim 1, wherein the program instructions comprise instructions for providing a real-time video feed to a requestor of the task order while the task is being performed.

4. The method of claim 1, wherein the task order further comprises a delivery address for an output of the task, and the method further comprises sending the delivery address to the one or more accounts registered with the selected one or more robotic devices.

5. The method of claim 4, wherein the confirmation that the task has been performed is received from a requester of the task order, wherein the requestor provides the confirmation in response to receipt of an output of the task order at the delivery address.

6. The method of claim 5, wherein the output comprises a tangible product.

7. A non-transitory computer-readable medium having stored therein instructions that, when executed by a computing device, cause the computing device to perform functions comprising:

receiving a task order, wherein the task order comprises:
information that identifies configuration requirements for a task to be performed by a robotic device that is selected from among a pool of robotic devices,
program instructions executable by the robotic device to perform the task,
information that identifies one or more actuators or sensors to be attached to the robotic device for performing the task, and
payment information for the task;

selecting one or more robotic devices that are configurable to perform the task from among the pool of robotic devices, wherein given robotic devices of the pool are configured to operate at given remote locations and the selected one or more robotic devices are leased for a period of time to perform the task by attaching the one or more actuators or sensors;

providing the configuration requirements, the information that identifies the one or more actuators or sensors, and the program instructions to the selected one or more robotic devices;

receiving confirmation that the task has been performed; and providing payment to one or more accounts registered with the selected one or more robotic devices.

8. The non-transitory computer-readable medium of claim 7, wherein the task order further comprises information that identifies one or more supply parts for performing the task, and the functions further comprise providing the information that identifies the one or more supply parts to the selected one or more robotic devices.

9. The non-transitory computer-readable medium of claim 7, wherein the task order further comprises a delivery address for an output of the task, and the functions further comprise sending the delivery address to the one or more accounts registered with the selected one or more robotic devices.

10. The non-transitory computer-readable medium of claim 9, wherein the confirmation that the task has been performed is received from a requester of the task order, wherein the requestor provides the confirmation in response to receipt of an output of the task order at the delivery address.

11. The non-transitory computer-readable medium of claim 10, wherein the output comprises data determined from the selected one or more robotic devices performing the task.

12. A system comprising:
at least one processor;
a memory; and
instructions stored in the memory and executable by the at least one processor to cause the processor to perform functions comprising:
receiving a task order, wherein the task order comprises:
information that identifies configuration requirements for a task to be performed by a robotic device that is selected from among a pool of robotic devices,
program instructions executable by the robotic device to perform the task,
information that identifies one or more actuators or sensors to be attached to the robotic device for performing the task, and
payment information for the task;
selecting one or more robotic devices that are configurable to perform the task from among the pool of robotic devices, wherein given robotic devices of the pool are configured to operate at given remote locations and the selected one or more robotic devices are leased for a period of time to perform the task by attaching the one or more actuators or sensors;
providing the configuration requirements, the information that identifies the one or more actuators or sensors, and the program instructions to the selected one or more robotic devices;
receiving confirmation that the task has been performed; and
providing payment to one or more accounts registered with the selected one or more robotic devices.

13. The system of claim 12, wherein the task order further comprises information that identifies one or more supply parts for performing the task, and the functions further comprise providing the information that identifies the one or more supply parts to the selected one or more robotic devices.

14. The system of claim 12, wherein the selected one or more robotic devices are associated with different accounts having separate owners.

15. A method comprising:
receiving a request to register an account for a robotic device with a cloud service, wherein the cloud service is configured to receive a task to be performed by one or more robotic devices that are selected from among a pool of robotic devices and leased for a period of time to perform the task, wherein the robotic device is among the pool of robotic devices;
receiving information that identifies one or more actuators or sensors to be attached to the robotic device for performing the task and program instructions executable by the robotic device to perform the task;
providing to the robotic device the information that identifies the one or more actuators or sensors to be attached to the robotic device for performing the task and the program instructions executable by the robotic device to perform the task;
receiving a result of performance of the task at the cloud service; and
providing payment for the task via the account.

16. The method of claim 15, further comprising:
receiving information that identifies one or more supply parts for performing the task; and
providing to the robotic device the information that identifies the one or more supply parts.

17. The method of claim 15:
wherein the program instructions comprise an address for sending the results of performing the task; and
wherein receiving the result of performance of the task comprises receiving from the robotic device the result of performance of the task at the address.

18. The method of claim 17, wherein the result of performance of the task comprise a tangible product resulting from the robotic device performing the task.

* * * * *